United States Patent [19]

Schwab

[11] 4,252,409
[45] Feb. 24, 1981

[54] WARNING REFLECTOR
[75] Inventor: Kurt Schwab, Innsbruck, Austria
[73] Assignee: D. Swarovski & Co., Wattens, Austria
[21] Appl. No.: 964,268
[22] Filed: Nov. 27, 1978
[30] Foreign Application Priority Data
  Nov. 28, 1977 [DE] Fed. Rep. of Germany ....... 2753029
[51] Int. Cl.³ ............................................. G02B 5/132
[52] U.S. Cl. ..................................... 350/106; 350/97; 404/14
[58] Field of Search ........................... 350/106, 97–105, 350/293, 211; 404/14, 22; 40/204, 130 M; 148/13, 25, 2; 72/54, 362

[56] References Cited
U.S. PATENT DOCUMENTS

| 402,930 | 5/1899 | Jacobs | 404/22 |
|---|---|---|---|
| 3,708,222 | 1/1973 | Stern | 350/211 X |
| 3,795,435 | 3/1974 | Schwab | 350/293 |
| 3,814,500 | 6/1974 | Ebenbechler | 350/293 |
| 4,026,641 | 5/1977 | Bosserman et al. | 350/293 |
| 4,116,540 | 9/1978 | Thomas | 350/293 |

FOREIGN PATENT DOCUMENTS 317729 10/1974 Austria .

Primary Examiner—John K. Corbin
Assistant Examiner—B. W. de los Reyes
Attorney, Agent, or Firm—Neuman, Williams, Anderson & Olson

[57] ABSTRACT

A warning reflector construction is provided comprising a transparent plate having a rear surface opposite a light-entrance surface. The rear surface comprises toric surfaces arranged side-by-side and supporting an outermost reflective layer. The optical axes of the toric surfaces can be arranged at an angle to the perpendicular to the light-entrance surface. The warning reflector can be produced by injection moulding or stamping.

13 Claims, 8 Drawing Figures

WARNING REFLECTOR

This invention pertains to a warning reflector. Warning reflectors are optical means particularly intended to avoid traffic accidents as between moving vehicles and animals at night. Many serious accidents occur near forested areas when animals such as deer are struck by fast-moving vehicles while crossing unlit roads during night time hours.

In the Austrian Pat. specification No. 371 729 a warning reflector for deer is described consisting basically of a prism plate which is sealed in a housing so that it is watertight. The erection of these known warning reflectors for deer have led to a considerable reduction of the number of accidents.

In known warning reflectors for warning animals such as deer of oncoming vehicles the entering light rays are diverted by a planar prism surface to a back surface of the prism surface and are totally reflected therefrom. The light emerging from a concave prism surface is more or less dispersed in accordance with the curvature of the surface.

Known warning reflectors possess the disadvantage of consisting of several individual parts which give rise to high production and assembly costs. Further, the necessity of a watertight housing employed in known reflector constructions is a disadvantage. Finally, known warning reflectors do not allow for variation in light ray reception and reflection by simple adjustment of the optically effective elements.

It is, therefore, the object of the invention to provide a warning reflector which is of simple design, resistant to weather, and which allows for variation of the reflected light paths in a simple manner.

This invention is based on the knowledge that this object can be achieved by means of a warning reflector, the reflection surface of which comprises several toric surfaces arranged side-by-side. A toric surface is a surface of revolution shaped like an anchor ring. It is generated by rotating a circle about a non-intersecting coplanar line as axis.

Other objects of this invention will become apparent from the following detailed description when read in the light of the drawing and appended claims.

One embodiment of the invention comprises a warning reflector composed of a transparent plate having a light-entrance surface and a reflective layer on a rear plate surface from which the reflected light is dispersed by means of several curved surface portions defining the rear surface and arranged side-by-side. The reflector plate is characterized by the fact that the curved surface portions of the rear surface are arranged opposite the light-entrance surface and comprise toric surfaces which support the reflective layer.

The invention further comprises a method of manufacturing a warning reflector wherein a metal sheet coated with transparent plastic is inserted into a forming tool and additional transparent plastic is applied to the sheet, and the metal sheet coated with plastic is simultaneously formed and fused to the applied plastic at an elevated temperature thereby forming the reflector.

In accordance with an alternative embodiment for the manufacture of a warning reflector, a plastic band having an enclosed metal sheet is rendered pliable by the addition of heat and formed out by stamping.

In accordance with a preferred embodiment the optical axes of the toric surfaces form an angle with the perpendicular to the light entrance surface both in the horizontal and in the vertical direction.

The toric surfaces of the reflector may be either convex or concave.

The warning reflectors made in accordance with the invention are characterized by the fact that their construction is very simple. In particular, the warning reflector can be embodied in a one-piece construction and is resistant to external influences, particularly the influence of weather and dirt. The entering light is reflected in a punctiform manner from the individual toroidal surfaces. By virtue of the arrangement of several side-by-side toroidal surfaces the illumination of the total surface can be achieved and thus a high optical efficiency can be guaranteed.

By variation of the optical axes of the individual toroidal surfaces simple and extensive variation of the course of the light rays is possible. On the other hand, this can be exploited by arranging the warning reflector at a smaller angle to the entering light ray. This leads to the enlargement of the active light-entrance surface. Further, it is possible to adapt the reflected light to the ground conditions, i.e., to direct the reflected light more upwardly or downwardly as the case requires. The course of the rays may also be varied in relation to the road by changing the optical axes of the torus surfaces. Finally, it is possible to arrange the optical axes of individual toric surfaces or individual groups of toric surfaces differently which means that further variations of the course of the rays can be achieved. This will be explained in more detail hereinafter.

Hereinafter, the invention will be explained in greater detail with reference to the drawing which shows examples of embodiments.

FIG. 1 gives a plan view of a warning reflector made in accordance with the invention;

Figure 1:
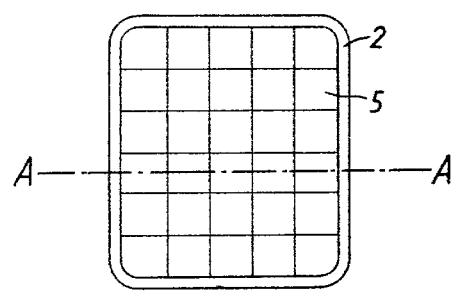

A plan view of a warning reflector for deer is shown in FIG. 1. It comprises a transparent plate 2. This plate consists preferably of a transparent plastic. Acrylic glasses, cellulose esters as well as cellulose acetates and cellulose acetobutyrates and polystyrols comprise suitable materials of composition for plate 2.

The thickness of the plate 2 depends basically on the selected division and the desired dispersion of the reflected light. In general, the thickness of the plate amounts to between 2 and 5 mm; for reasons of cost the plates are adapted to be as thin as possible.

The size of the plates can be selected as desired. As they are usually affixed to road guide posts, they usually assume the shape of a rectangle having a height ranging from between 5 to 15 cm and width ranging from between 3 to 10 cm.

The division of the warning reflector into individual toric surfaces 5 can be extensively varied. The division depends on the desired dispersion and on the radii of the torus surfaces. A narrow division is selected if at a short distance from the reflector the latter is required to have a fully illuminated surface. By way of example, 3 to 20 torodial surfaces may be arranged side by side in the horizontal direction and 5 to 30 in the vertical direction. A suitable embodiment exhibits approximately 80 to 100 individual torodial surfaces.

Figure 2:
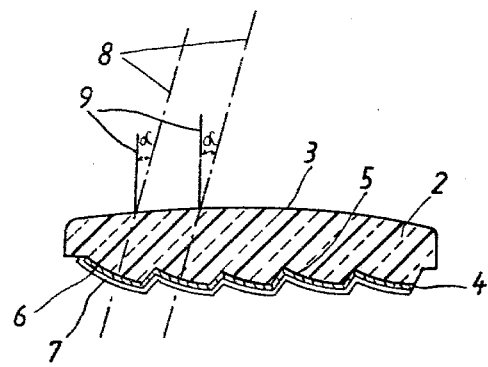
FIG. 2 is a cross-sectional view along the line A—A of FIG. 1.

In FIG. 2 the embodiment of the reflection surface 4 in the form of individual surfaces 5 is clearly visible. The plate 2 bears a reflective layer 6 on the side opposite the light entrance surface 3. The reflective layer is normally a metal layer, e.g., an aluminum or silver layer. The application of these layers, for instance, by means of a high vacuum coater, is known. Alternatively, the reflective layer 6 may comprise an aluminum sheet coated with plastic on one or both sides and connected in a suitable manner to the plate 2. To protect the reflective layer, a suitable protective layer 7, e.g., a lacquer layer, may be provided.

The light-entrance surface 3 is preferably slightly curved in order to avoid undesired surface reflection.

The plastic plate 2 may be colored, e.g., red or green. According to the opinions of behavioural research scientists, animals such as deer respond particularly well to these colors in reflector devices of this type.

The selection of the radii for the individual toric surfaces 5 depends on the desired light dispersion and on the division. Suitable radii lie in the range of between 5 and 25 cm. A smaller radius, e.g., between 5 and 15 cm, is mostly selected for the curvature in the horizontal direction because a wider angle of dispersion of up to approximately $\pm 28°$ is preferred. The radius of the toric surfaces for the curvature in the vertical direction is in general larger and should lie preferably in the range of 15 to 25 cm. The provision of a very wide dispersion angle, for instance large horizontal fanning for a winding landscape, may also be employed when the surrounding terrain so warrants. In such cases one radius of the torus surface may also be infinite.

Angles of dispersion amounting in the horizontal direction to between $\pm 10°$ and $\pm 30°$, in particularly amounting to approximately $\pm 25°$, and amounting in the vertical direction to between $\pm 4°$ and $\pm 10°$ for the normal reflector as well as to between $\pm 10°$ and $\pm 30°$ for a reflector disposed adjacent an embankment are normally preferred.

Figure 3:
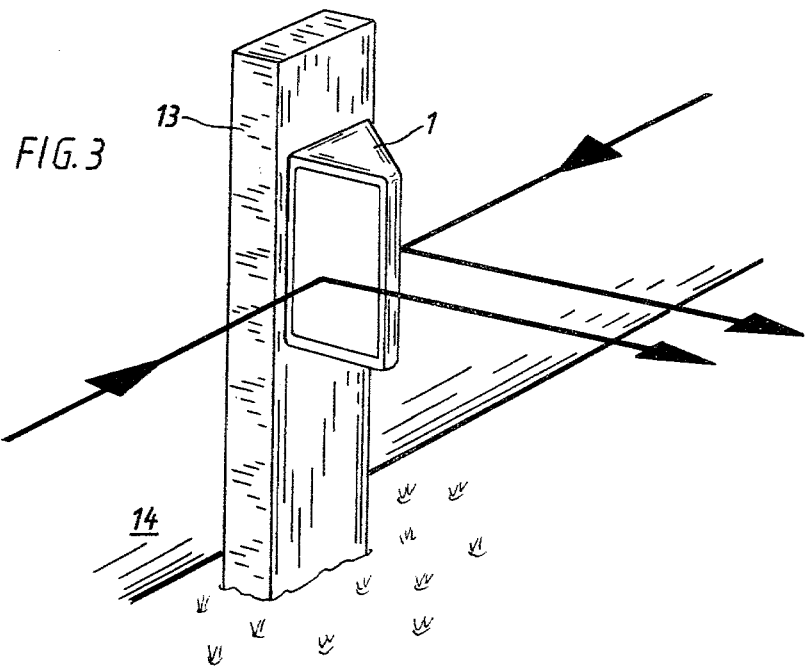
FIG. 3 shows a warning reflector mounted on a guide post as well as the course of the light rays striking the same.

FIG. 3 illustrates in perspective a warning reflector 1 attached to a guide post 13. Also, the course of the light from a motor vehicle approaching each of the two sides is shown for the central beam (main and emergent direction).

Figure 4:
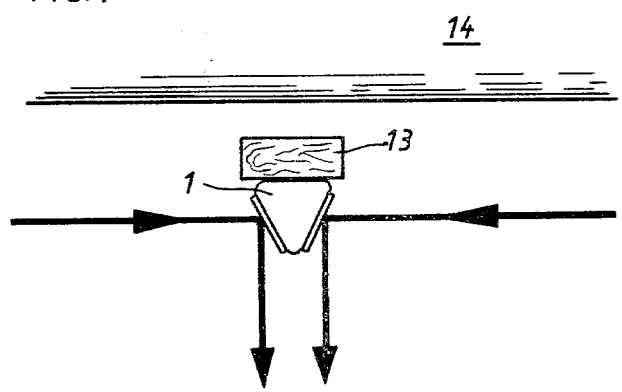
FIG. 4 is a top view of the warning reflector of FIG. 3.

FIG. 4 shows in top plan view the warning reflector 1 mounted on a guide post 13, and the course of the light rays striking the same. In the case of the entering light being approximately parallel to the side of the road, the inclination of the reflection plate 2 must be at an angle of 45° to the entering light if the main direction of reflection is intended to be perpendicular to the entering ray of light or perpendicular to the road. In the latter case the angle enclosed by both plates must amount to 90°. By arranging the plates at an angle of 45° to the entering light the active light entrance surface is reduced.

In accordance with a preferred embodiment, the warning reflector can be arranged in such a manner that the angle between the two plates 2 is smaller than 90°. In so doing the active light-entrance surface and thus the optical effect is increased. In accordance with a preferred embodiment, the angle between the two plates 2 amounts to approximately 60°. In such disposition if it is desired that the main direction of the reflection be perpendicular to the entering light beam, this can be achieved by arranging the optical axes of the toric surfaces at an angle to the perpendicular to the light-entrance surface. In this case the angle $\alpha$ (FIG. 2) amounts to approximately 12°.

Figure 6:
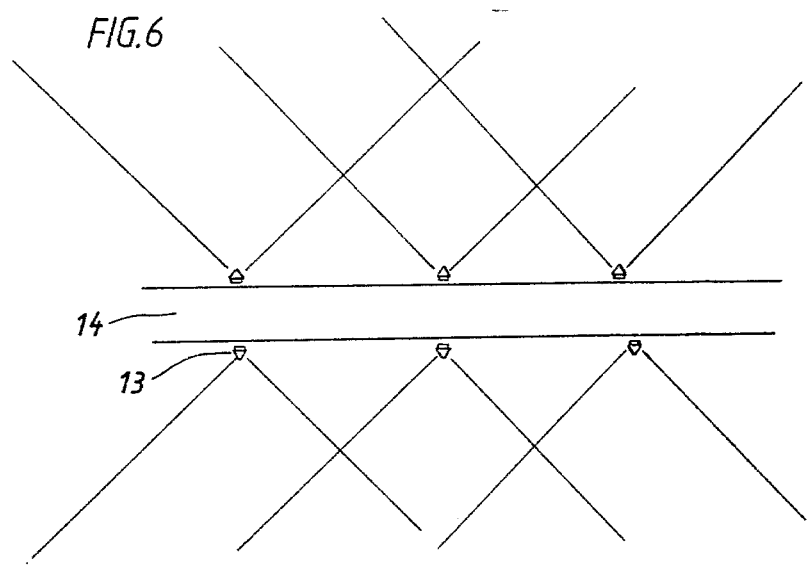
FIG. 6 shows the illumination of the ground by means of warning reflectors made pursuant to this invention.

By varying the angles between the optical axes of the toric surfaces and the perpendicular to the light-entrance surface it is possible to vary to any degree the illumination of the ground, the dispersion remaining constant. The illumination of the ground effected when the main direction of reflection is perpendicular to the road and horizontal is shown in FIG. 6. By varying the angle of the optical axis, the main direction of reflection and hence the illumination of the ground can be varied as desired.

Figure 5:
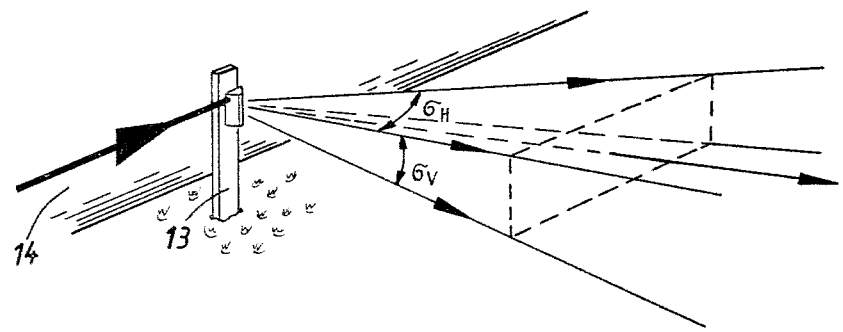
FIG. 5 shows the image of the rays from the warning reflector of FIGS. 3 and 4.

In order to achieve high light intensities it is preferable to maintain the dispersion of the reflected light low in the vertical direction. In FIG. 5 the fanning of the light is shown schematically. The dispersion in the horizontal direction is indicated by $\delta H$ and the dispersion in the vertical direction by $\delta V$. Since the ground bordering the road often falls down from the road or forms an embankment, the variation of the main direction of reflection may be downwardly or upwardly from the horizontal to achieve optimum ground illumination at high light intensity, depending on the ground condition. Desired angular reflection may be effected by corresponding inclination of the reflective plates 2 or of the whole warning reflector 1.

Both measures, however, give rise to adjustment problems which make the fixture of the warning reflector to the guide post difficult. The use of positioning wedges causes difficulties when automatic cleaning is carried out, and also causes difficulties from the point of view of transport technology because thus the aspect of signal of the guide post is changed to a large extent. In warning reflectors made in accordance with this invention, the variation of the main direction of reflection in the vertical direction can, however, be achieved by simply inclining the optical axes of the toric surfaces towards the perpendicular to the light entrance surface. Hence, the warning reflector can be adapted to all forms of terrain in a simple manner.

In particular, "embankment warning reflectors for animals" may be devised in which the main direction of reflection deviates from the horizontal line, this deviation amounting by way of example to an angle of 10° 20° and 30°.

The provided reflector construction also enables the optical axes of individual, toric surfaces or individual groups of toric surfaces, for instance of individual perpendicular rows, to be arranged at various angles to the perpendicular to the light-entrance surface. Thus, on the approach of a motor vehicle a change in the direction of reflection is effected which presents itself as a glittering or glimmering when the dispersion of the light is low.

The arrangement of the toric surfaces of the provided reflectors in a manner whereby the optical axes thereof are at an angle to the perpendicular of the light-entrance surface can be carried out by suitably inclining the toric surfaces.

It may also be advantageous to incline the optical axes of the toric surfaces in various portions of the reflector plate at various angles in order to cover a large range of dispersion when the dispersion is relatively low and hence the light intensity is high. Thus, one group of toric surfaces may, for instance, cause a dispersion amounting to between 20° and 40° and another group may cause a dispersion amounting to between 40° and 60°.

For the purpose of mounting, the plates 2 may be enclosed in a housing, e.g., made of plastic, and this housing may be attached to the guide post.

It is preferred to embody the warning reflectors in a single piece. It then consists of only two plates arranged at an angle to each other and a suitable attaching means for mounting on the guide post. The advantages of the one-piece embodiment lie in the fact that its manufacture is simple, the costs of production are low, and it can be simply cleaned.

A further suitable possibility of manufacture is seen in the forming out of the plates 2 and framing the same with plastic to form the finished warning reflector.

The manufacture of the plates 2 or the warning reflector comprising two plates arranged at an angle and embodied in one piece may be carried out by injection die-casting. Alternatively, the plates may be manufactured in a suitable forming tool in which they are shaped by molding.

Figure 7:
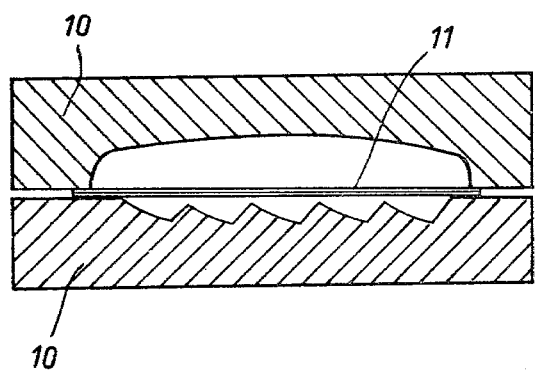
FIGS. 7 and 8 are cross-sectional views of a forming tool for manufacturing a warning reflector of this invention.
Figure 8:
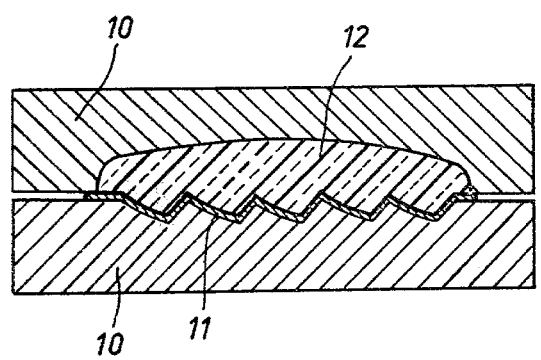

A preferred method of manufacturing the plates is illustrated in FIGS. 7 and 8. A metal sheet 11, e.g., an aluminum sheet, coated with transparent plastic is introduced into an injection die-casting tool 10. This is shown schematically in FIG. 7. Then the plastic for forming the plate is introduced into the injection die-casting tool. The forming out of the plastic plate and the connection of the introduced plastic 12 with the plastic coating provided on the metal sheet 11 is then carried out simultaneously at an elevated temperature. The formed article is shown in FIG. 8. Utilizing this method of manufacture, a reflector plate is obtained in which the metal sheet is completely surrounded by plastic and in which a secure engagement between the metal sheet and the plastic is achieved in a simple manner.

According to an alternative embodiment, the plates of the warning reflector may be manufactured from a plastic band with an enclosed metal sheet. The plastic coating on both sides of the metal sheet may vary in thickness. Its thickness depends on the desired thickness of the finished plates. A plastic bond of this kind is rendered pliable by the addition of heat and is formed in a suitable forming tool by stamping.

It is preferred to have the plastic coating on the rear surface of lesser thickness. It is also possible to provide a plastic coating on only one side of a metal sheet.

A further method of manufacturing the plates 2 of the warning reflector comprises forming out the plates from transparent plastic by means of injection die-casting and then providing such plates with a reflective layer, e.g., by applying aluminum in a high vacuum coater.

The function of the warning reflectors for animals such as deer can be seen from FIG. 6. When a motor vehicle approaches, the rays entering the reflectors are reflected into the surrounding terrain and the animal is deterred from crossing the road 14 because of the optical signals. It is also possible to arrange the warning reflectors for deer on the opposite side of the road and facing towards the road.

It is believed that the foregoing has made obvious a number of modifications of the provided reflectors which are within the ambit of the invention disclosed. This invention, therefore, is to be limited only by the scopy of the appended claims.

What is claimed is:

1. In a warning reflector comprising a transparent plate having a light-entrance surface and a spaced-apart reflective surface from which the reflected light is dispersed, the improvement comprising said reflective surface being formed from a plurality of toric surfaces in side-by-side relation.

2. The warning reflector of claim 1 wherein the optical axes of the toric surfaces are at an angle to the perpendicular to the light-entrance surface.

3. The warning reflector of claims 1 or 2 wherein the optical axes of the toric surfaces are in two planes at an angle to the perpendicular of the light-entrance surface.

4. The warning reflector of claims 1 or 2 wherein the angles between the optical axes of the toric surfaces and the perpendicular to the light entrance surface vary in resepect of different toric surfaces.

5. The warning reflector of claims 1 or 2 wherein the angle between the optical axes of the toric surfaces and the perpendicular to the light-entrance surface amounts to between approximately 5° and 30° in respect of horizontal dispersion.

6. The warning reflector of claim 5 wherein the angle amounts to approximately 12°.

7. The warning reflector of claims 1 or 2 wherein the angle between the optical axes of the toric surfaces and the perpendicular to the light entrance surface amounts to between approximately 5° and 40° in respect of vertical dispersion.

8. The warning reflector of claim 7 wherein the angle amounts to between approximately 15° and 25°.

9. The warning reflector of claims 1 or 2 wherein the radius of the toric surfaces is between approximately 5 and 25 cm for the curvature in the horizontal direction.

10. The warning reflector of claims 1 or 2 wherein the radius of the toric surfaces is between approximately 5 and 25 cm for the curvature in the vertical direction.

11. The warning reflector of claims 1 or 2 wherein the warning reflector is embodied in one piece comprising two plates arranged at an angle to each other.

12. The warning reflector of claim 11 wherein the angle between the plates amounts to approximately 60°.

13. The warning reflector of claims 1 or 2 wherein the reflective layer is made of aluminum.

* * * * *